United States Patent [19]

Jackman

[11] Patent Number: 4,741,836
[45] Date of Patent: May 3, 1988

[54] SLUDGE TREATMENT PROCESS
[75] Inventor: Dale Jackman, Munster, Ind.
[73] Assignee: Jackman Enterprises, Inc., Munster, Ind.
[21] Appl. No.: 835,188
[22] Filed: Mar. 3, 1986
[51] Int. Cl.$^4$ .............................................. C02F 11/14
[52] U.S. Cl. .................... 210/709; 210/729; 210/738; 210/780; 100/74
[58] Field of Search ............... 210/609, 780, 727, 709, 210/729–736, 738–740, 808; 100/73, 74, 93 S

[56] References Cited

U.S. PATENT DOCUMENTS

| | | | |
|---|---|---|---|
| 2,894,603 | 7/1959 | Vassan | 183/121 |
| 3,147,217 | 9/1964 | Halton | 210/44 |
| 3,179,252 | 4/1965 | Vrablik | 210/120 |
| 3,301,779 | 1/1967 | Kovacs | 210/44 |
| 3,418,236 | 12/1968 | Mail | 210/44 |
| 3,637,490 | 1/1972 | Gardner et al. | 210/44 |
| 3,836,460 | 9/1974 | Willis et al. | 210/44 |
| 3,939,763 | 2/1976 | Soto | 100/93 |
| 3,940,334 | 2/1976 | Miyazawa | 210/21 |
| 4,158,627 | 6/1979 | Ingemarsson | 210/780 X |
| 4,160,732 | 7/1979 | Maffet | 210/780 X |
| 4,186,089 | 1/1980 | Okada | 210/780 X |
| 4,380,496 | 4/1983 | Maffet | 210/780 |
| 4,479,879 | 10/1984 | Hashimoto et al. | 210/727 |

Primary Examiner—Tom Wyse
Attorney, Agent, or Firm—James P. Ryther

[57] ABSTRACT

A system for extracting moisture from sludge of the type handled by municipalities and industries. The system involves the use of a feed line where the sludge is mixed with a chemical treating agent adapted to achieve flocculation. The sludge is conveyed, with or without some partial separation of moisture, to a progressive cavity continuous press for feeding of the sludge through the press. The press is of the type employing a slotted or screened housing with an interior shaft so that the cavity of the press is defined between the shaft and the housing. The size of this cavity progressively decreases from the inlet end to the outlet end of the press whereby the mixture is gradually compressed as it moves through the press. Moisture contained in the mixture is thereby extracted through the housing which is designed to at least minimize passage of solids. A discharge chamber is located at the outlet end of the press for collecting the partially dehydrated mixture. Portions of the sludge may be diverted prior to entry into the progressive cavity continuous press and conveyed to a separate collection site whereby a sludge product with an intermediate moisture content becomes available.

8 Claims, 6 Drawing Sheets

FIG-1

FIG_13_

FIG_14_

FIG_15_

SLUDGE TREATMENT PROCESS

BACKGROUND OF THE INVENTION

This invention relates to a system for the treatment of a sludge of the type normally encountered by municipalities and industries. In typical situations, the sludge is developed at waste collection sites to which municipal and industrial waste water of various types is delivered.

Various techniques may be utilized for treatment of waste water including the location of the waste in a settling tank or bed for clarification. The solids portion settles out and the clarified water portion may then be returned to an adjacent stream, river, etc. with or without further treatment.

The solids portion, known as sludge, may be transferred to a lagoon or the like, allowed to dehydrate to various levels of moisture content, and then be trucked to a permanent disposal site.

It has been found, however, that an unduly long period of time is often required to reduce the moisture content of the sludge to a level where the partially dehydrated sludge can be efficiently transferred to another location. Thus, where the remaining moisture content is rather high, the expense of shipping to a fill-site or other permanent disposal site can be quite large due to the weight of the moisture. Furthermore, large and often expensive sites may be needed for effective dehydration.

For the above-noted reasons, attempts have been made to achieve removal of liquid content in sludge by utilizing systems other than dehydration lagoons and the like. The efficiency of systems for extracting liquids from sludge, however, must be constantly reviewed in order to determine whether the system costs warrant the expense of operating the system. In other words, those costs must be weighed against the costs of shipping sludge with a high moisture content to a permanent disposal site. Systems for achieving extraction of excess moisture, for example by the use of presses and the like, have not been widely adopted because of such lack of efficiency.

SUMMARY OF THE INVENTION

The system of this invention involves means for handling sludge and, therefore, the system would normally be located at waste disposal facilities maintained by municipalities and large industrial sites. The sludge is delivered through pipes or other conduit means where it can be mixed with a chemical treating agent which will result in flocculation of the sludge.

This delivery pipe or conduit ultimately extends to a progressive cavity continuous press to achieve extraction of liquid from the sludge. The press comprises a housing formed with a screened wall and an interior shaft with the size of the cavity defined by the shaft and housing progressively decreasing from the inlet end to the outlet end of the press. In this fashion, the flocculated mixture is gradually compressed as it progresses through the press and, due to the wall openings, the liquids contained in the mixture are extracted through the housing wall. Means for collecting the mixture are located at an outlet end of the press.

In accordance with preferred forms of the invention, the flocculated mixture is initially delivered to a distribution hopper which will serve to deliver the mixture to two or more conveyors interposed between the hopper and the progressive cavity press. In addition, the conveyors are provided with drains so that a portion of the liquid in the sludge is removed as the sludge progresses through the conveyors to thereby diminish the liquid content of the sludge mixture delivered to the press. Means are also provided for selectively diverting a portion of the sludge removed from such conveyors so that sludge with a higher percentage of liquid can bypass the press where this sludge has independent utility.

The progressive cavity continuous press is preferably of a design having a spiral flite extending along the central shaft of non-uniform dimension, e.g., tapered, with the outer edge of the flite coming in close contact with the wall of the press housing. The pitch of the flite gradually decreases from the inlet end to the outlet end to thereby achieve the desired compression. At the outlet end, the spiral nature of the flite ends and the flite continues along a straight line parallel with the axis of the shaft. This feature provides for cleaning of the wall openings of the press housing in the critical area just prior to discharge.

DESCRIPTION OF THE SPECIFIC EMBODIMENTS

Figure 1:
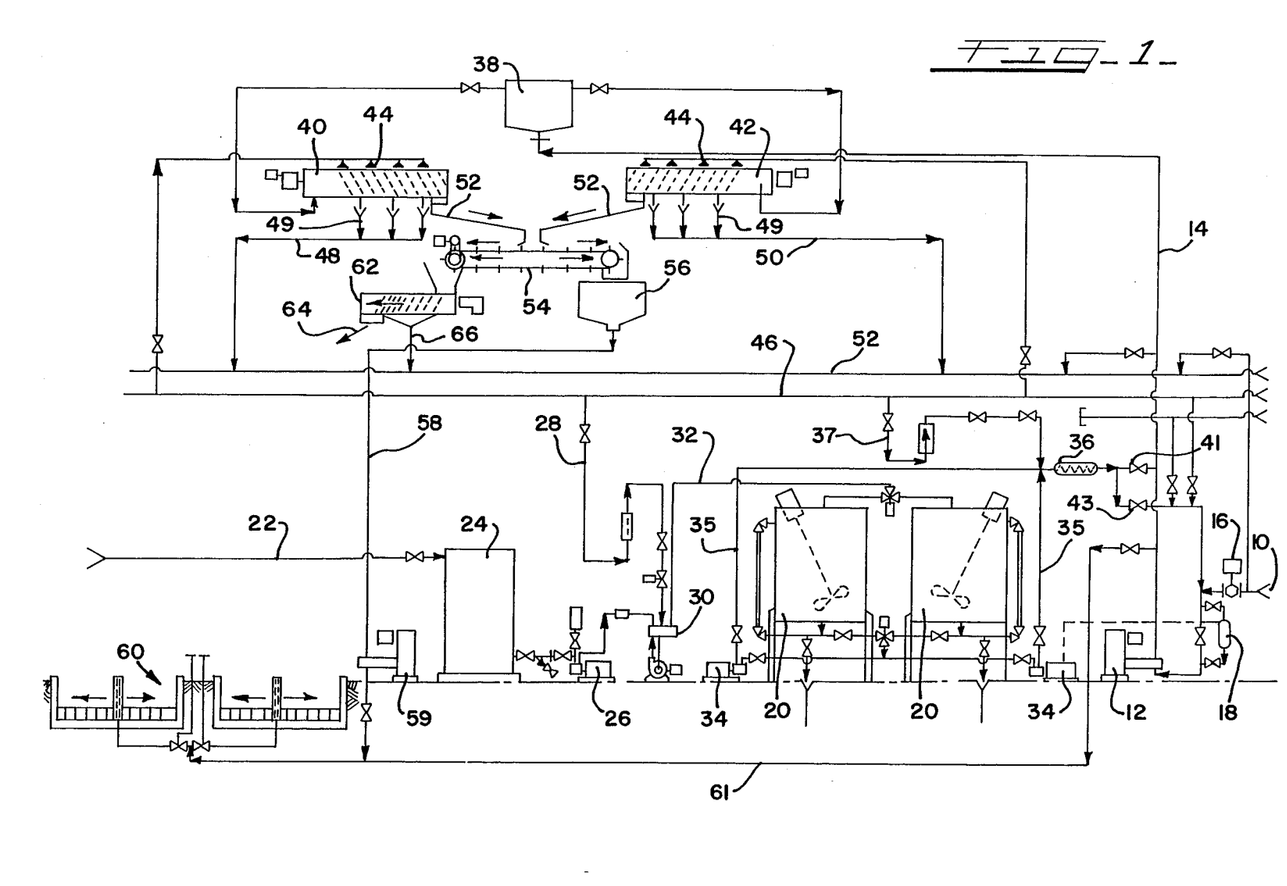
FIG. 1 comprises a diagrammatic view of a sludge treatment system of the type contemplated by this invention.

FIG. 1 of the drawings provides a diagrammatic view of a sludge treatment system incorporating various features invented by applicant. In this system, sludge which will typically comprise two to five percent solids is introduced at inlet 10. A feed pump 12 transports the sludge through line 14, and a mechanical device 16 of conventional design may be utilized for eliminating lumps in the sludge to enhance the pump suction. The concentration of solids in the sludge may be monitored with unit 18 for purposes to be discussed.

A pair of mixing tanks 20 are provided for storing a chemical capable of achieving flocculation of the sludge. A polymer, for example type No. 7125 manufactured by Nalco Chemical Company, may be used for this purpose.

The polymer is introduced to the system through line 22 which extends to polymer storage tank 24. The pump 26 delivers the polymer along with water from line 28 to a blending unit 30 so that a suitable concentration of polymer-containing fluid will be delivered to the storage tanks. An approximately two-percent polymer solution is desired with the percentage varying, depending on the solids concentration of the sludge. As indicated, this concentration can be monitored with the unit 18, and suitable controls utilized for regulating the flow of polymer from mixing tanks 20 through the feed pumps 34 to be discussed.

The polymer from blend unit 30 is passed through line 32 to the storage tanks 20. Pumps 34 deliver the polymer from the storage tanks through lines 35 to mixer 36 and the polymer then passes through valves 41 and/or 43 for joining of the polymer with the sludge being fed to the system. Additional dilution of the polymer can be achieved where desired by adding water through line 37 before the polymer reaches mixer 36.

Through the operation of feed pump 12, the mix of polymer and sludge is fed through line 14 to distribution hopper 38. In the particular system shown in FIG. 1, the hopper 38 feeds the sludge-polymer mix to one or both of the conveyors 40 and 42. These conveyors may be of a type having sprays 44 adapted to spray water fed from line 46 into the respective conveyors for cleansing purposes. An at least equal amount of water is preferably dispensed from the conveyors into lines 48 and 50 for introduction to return line 52. This return line will ordinarily extend to the input of a treatment plant for purification of the water. To the extent necessary, of course, this water may be used for recycling purposes.

The outlet ends of the conveyors 40 and 42 are connected by means of chutes 52 to a conveyor 54. This conveyor is provided with a reversible motor so that in one mode of operation, the sludge will be delivered to tank 56 and then pumped through line 58 by means of pump 59 to a holding area 60. This holding area may consist of beds for retaining the sludge whereby liquid can be removed through evaporation or through drainage from the bottom of the beds. The output from the tank 56 will have a relatively low solids content, for example in the order of 10 percent. Where adequate beds are available, however, further removal of liquid over a relatively long period of time can provide for more economical shipping. In addition, there are some uses for sludge with a solids content in the order of 10 percent, and this system provides versatility, through the use of tank 56, permitting recovery of this low-density sludge.

Additional versatility is provided by the fact that input at 10 can be diverted to holding area 60 through line 61. Thus, the area 60 can always be utilized to its full extent.

The conveyor 54 is also adapted to be operated in the reverse direction whereby the sludge output from conveyors 40 and 42 is delivered to the progressive cavity continuous press 62. As will be explained in greater detail, this press operates to develop a sludge with a much higher solids content, for example in the order of 20 to 35 percent solids whereby the output of the press (at 64) can be more economically transported to a disposal site. Thus, there is no need for any additional treatment of this output, for example, by evaporation or in settling beds. The water output of the press passes through line 66 to line 52 for transfer to a treatment plant or for other use as indicated above.

Figure 2:
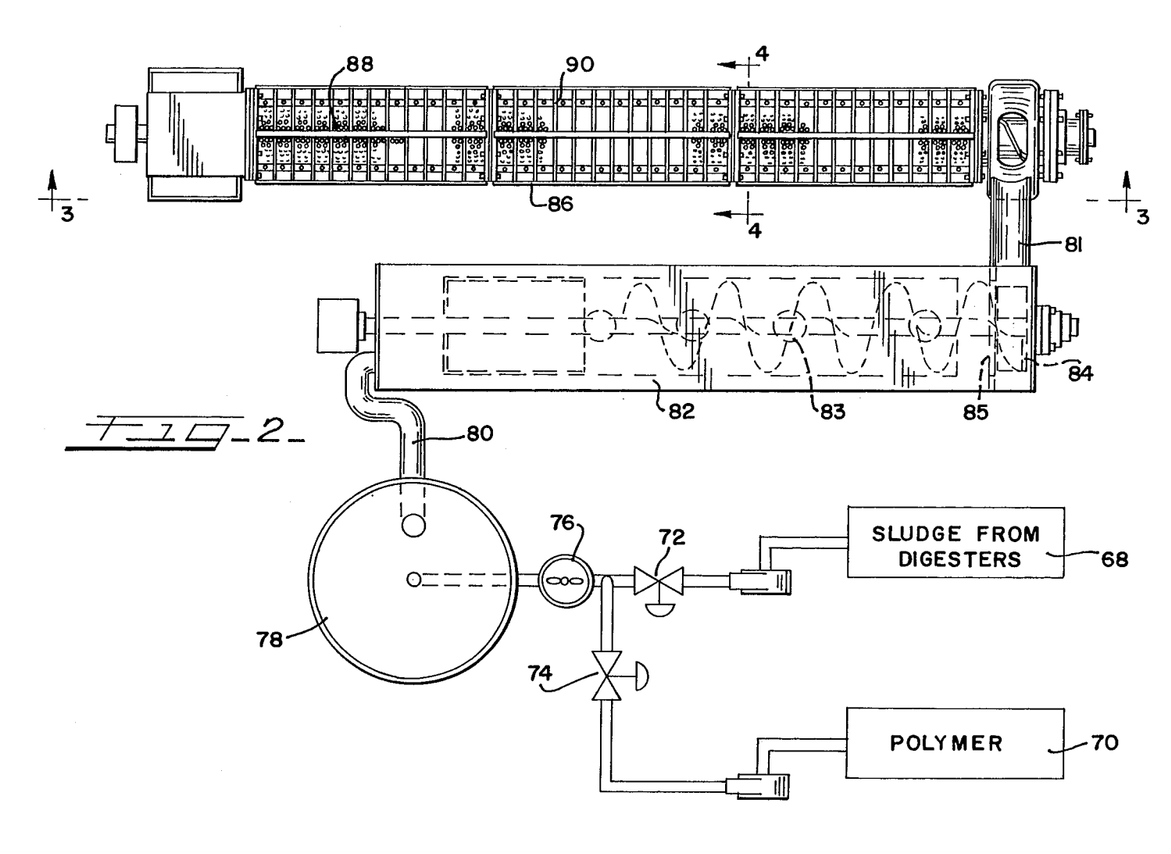
FIG. 2 comprises an alternative form of a treatment system illustrating delivery of sludge to a progressive cavity press.
Figure 3:
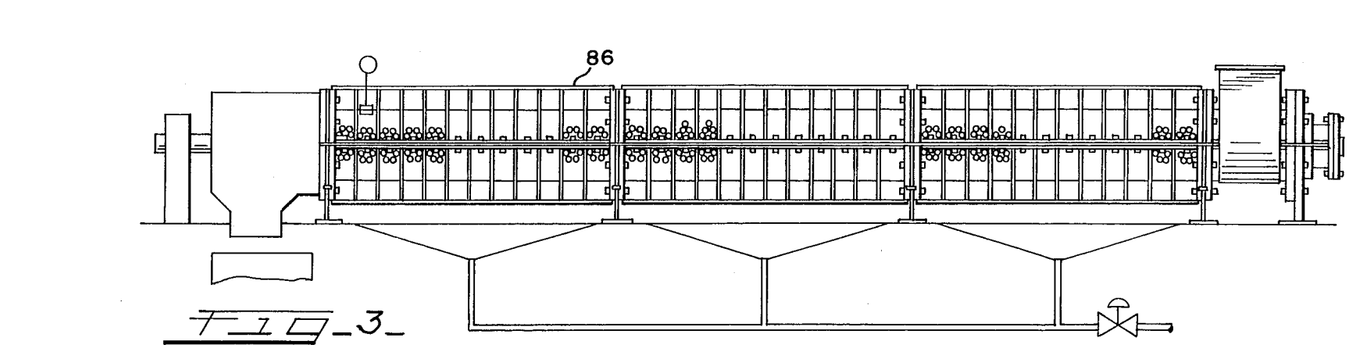
FIG. 3 comprises an elevational view of a progressive cavity press taken about the line 3—3 of FIG. 2.
Figure 4:
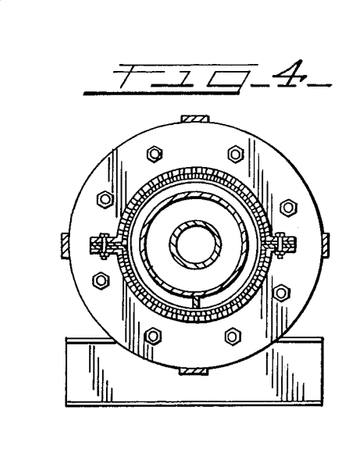
FIG. 4 comprises a cross-sectional view of the press taken about the line 4—4 of FIG. 2.
Figure 5:
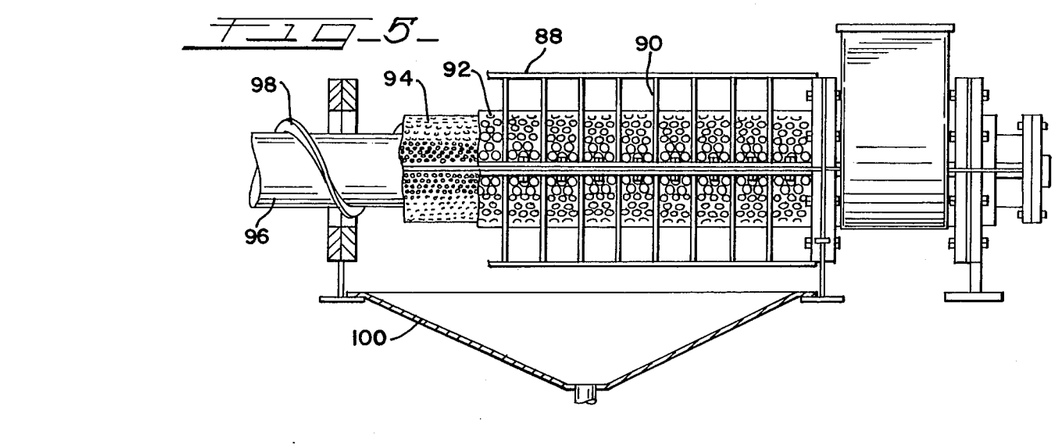
FIG. 5 is an enlarged fragmentary detailed view of the inlet end of the press shown in FIG. 2.
Figure 6:
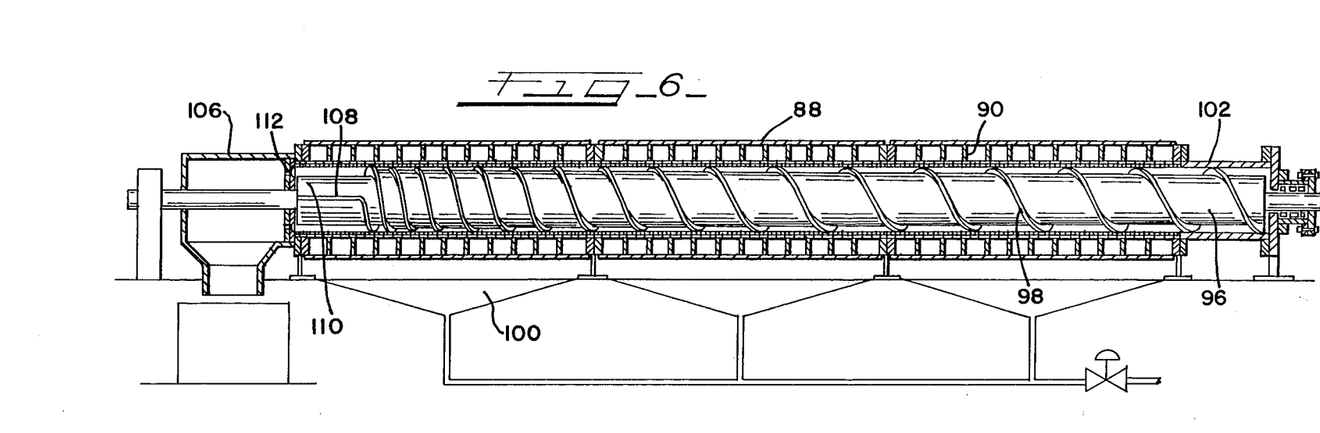
FIG. 6 is a longitudinal cross-sectional view of the press shown in FIG. 2.

FIG. 2 illustrates an alternative form of the invention comprising a source 68 for sludge of the two to three percent solids type and a source 70 for polymer. These materials are fed, respectively, through valves 72 and 74 to a mixer 76 and then to a hopper 78.

Line 80 extending from the hopper connects with conveyor 82 so that the sludge can be efficiently delivered through outlet 84 and trough 81 directly to a progressive cavity press 86. Openings 83 defined in the bottom of conveyor 82 collect liquid released in the course of sludge movement through the conveyor in the manner shown at 49 in FIG. 1. Any suitable dam located at 85 may be situated at the bottom of the conveyor to prevent any excess liquid from passing into conduit 84. As will be appreciated, the overall arrangement shown in FIG. 2 eliminates the use of the separate conveyor 54 shown in FIG. 1 which may be used for by-passing the progressive cavity press.

FIGS. 2 through 6 illustrate the progressive cavity press 86 in greater detail. As will be appreciated, this press includes a surrounding re-inforcing frame consisting of longitudinally extending bars 88 and circular plates 90. A screen structure comprising cylindrical screens 92 and 94 is supported within the confines of the plates 90, and a screw consisting of shaft 96 and flite 98 is positioned within the cylindrical screen assembly.

The perforations in the screen assembly permit the flow of water outwardly into collection troughs 100 as the sludge progresses through the press. It will be noted that the pitch of the spiral flite 98 decreases gradually from the inlet end 102 to the outlet end 106 of the press. This results in more severe compression of the sludge as it nears the outlet end of the press so that a maximum amount of liquid can be squeezed from the sludge before the sludge is discharged from the press.

The diameter of flite 98 is such that it will move closely adjacent the perforated screen 94 so that the flite has a tendency to scrape the surface of the screen during press operation. In addition, the flite terminates in a section 108 adjacent the outlet end of the press, and this section serves as a wiping element with respect to the perforated screens in the area of the outlet end. This also provides a desirable means for continuously scraping the screen, and thereby minimizing clogging or other adverse operating conditions.

The shaft 96 is also of non-uniform diameter to further enhance compression of the sludge in the press. It will be noted, in particular, that the spacing between the screen 94 and the shaft 96 progressively decreases from the inlet end to a point near to, but not completely to, the outlet end. This spacing may be accomplished by tapering the shaft, and the spacing may diminish from a maximum of one inch to a minimum of one-quarter inch. Much more efficient liquid release is achieved from the thinner sludge cake which develops near the end of the shaft.

As shown, the spacing increases adjacent the outlet end, beyond the extent of flite 98, for example back to a one inch spacing. This design eliminates clogging problems which could occur if the thin cake were maintained throughout the length of the flite.

Figure 7:
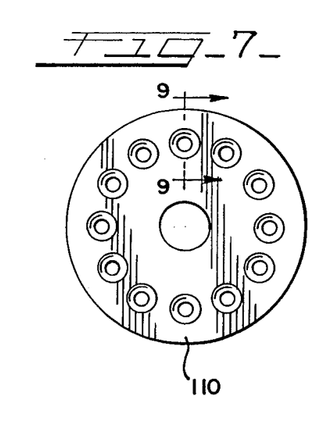
FIG. 7 is a plan view of a perforated disc utilized at the outlet end of the press.
Figures 8, 9, 10:
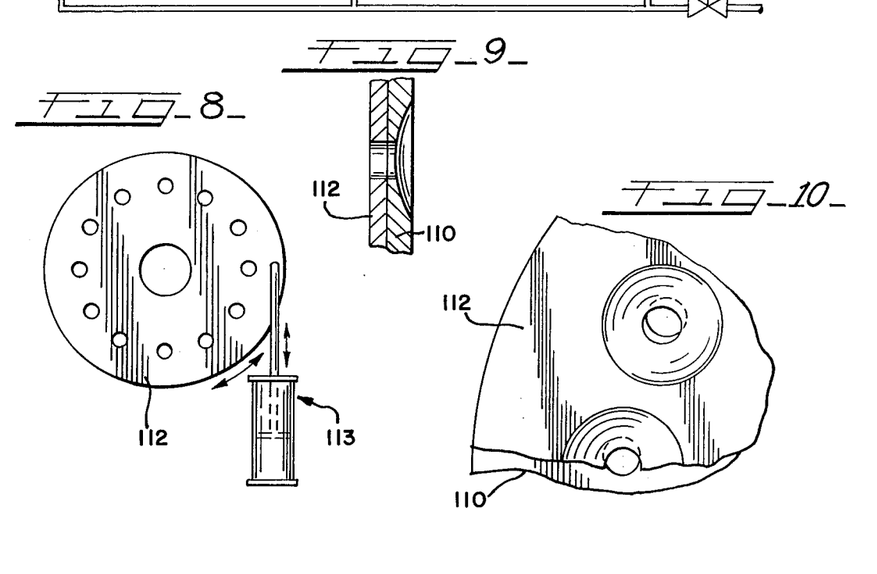
FIG. 8 is a plan view of a perforated disc used in association with the disc of FIG. 7.
FIG. 9 is an enlarged fragmentary cross-sectional view taken about the line 9—9 of FIG. 7.
FIG. 10 is an enlarged fragmentary plan view illustrating the cooperation of the discs shown in FIGS. 7 and 8.

A pair of discs 110 and 112 are supported by the press adjacent the outlet end. As best shown in FIGS. 7–10, these discs include a plurality of openings which are adapted to be aligned as shown in FIG. 9 to thereby provide for discharge of sludge from the press. The disc 112 is relatively moveable, for example, by means of a piston and cylinder arrangement 113, so that the disc 110 can be misaligned to any desirable degree relative to disc 112 thereby reducing the size of the respective openings. It will be appreciated that by so-limiting the size of these openings, and by maintaining a constant speed for the press shaft, the amount of pressure applied to the sludge can be varied. This permits control of the amount of discharge of liquid from the sludge so that sludge of a desirable solids content can be recovered. This provides an important characteristic of the system since some operations, for example operations using sludge for fertilizer, can require a relatively narrow range of solids percentage.

Figure 11:
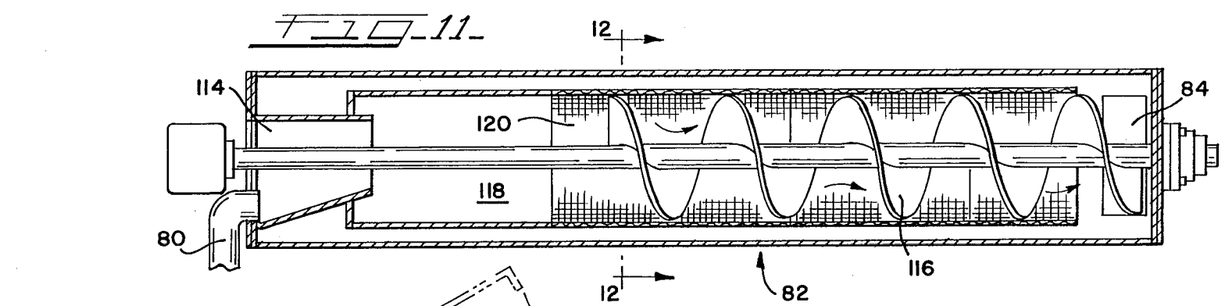
FIG. 11 is a longitudinal cross-sectional view of a conveyor suitable for use in the system.
Figure 12:
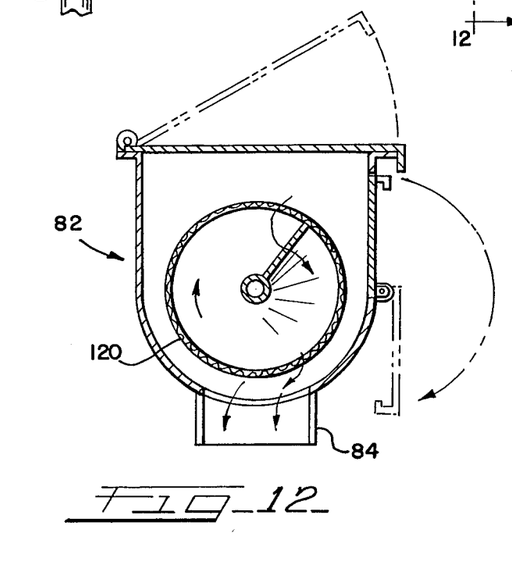
FIG. 12 is a cross-sectional view of the conveyor taken about the line 12—12 of FIG. 11.

FIGS. 11 and 12 illustrate a conveyor of the type shown at 82 in FIG. 2. This conveyor includes an inlet passage 114 for receiving sludge from the distribution hopper 78. Screw conveyor 116 serves to convey the sludge to outlet conduit 84 for delivery to conveyor 52 as shown in FIG. 1 or directly to the progressive cavity continuous press 86 as shown in FIG. 2.

Sludge delivered through conduit 80 initially enters an enclosed cylindrical area 118 which communicates with cylindrical screen 120. The provision of the screen allows for passage of liquid out of the conveyor so that the solids content of the sludge can be at least partially increased during movement through this conveyor.

Figure 13:
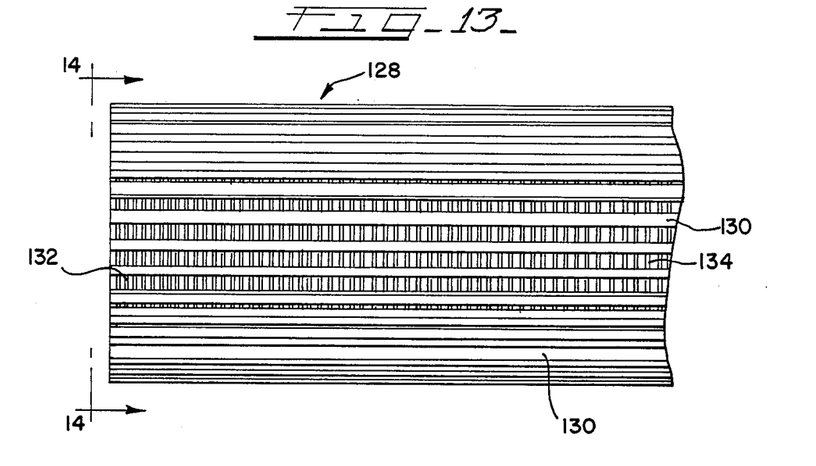
FIG. 13 is a fragmentary elevational view of an alternative form of a press contemplated by this invention.
Figure 14:
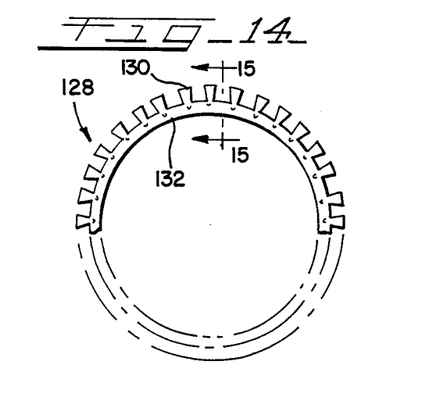
FIG. 14 is an end view of the press of FIG. 13.
Figure 15:
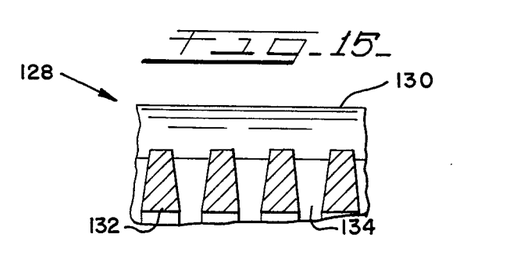
FIG. 15 is an enlarged fragmentary view taken about the lines 15—15 of FIG. 13.

FIGS. 13 through 15 illustrate an alternative screen configuration 128 which can be substituted for the screens 92 and 94 utilized in the press of FIGS. 2-6. When considering the discussion of this alternative, it will be understood that the reinforcing means 88 and 90 can generally be eliminated since the alternative has significant self-supporting capability. In addition, it should be understood that the shaft and flite means, as well as the inlet and outlet arrangements shown in FIGS. 2-6, are all compatible to the alternative of FIGS. 13-15.

The screen configuration 128 of FIGS. 13-15 is achieved by means of a plurality of wire rings 132 held in assembly by means of longitudinally extending support rods 130. The spacing between adjacent rings provides openings 134 for the discharge of liquid from the sludge passing through a press utilizing this type of screen. It will be noted when considering the triangular cross-section of the rings, that the openings 134 are smallest adjacent the inner surface of the cylinder formed by the screen configuration, and that they gradually increase in size. This feature significantly minimizes any clogging tendency since there is immediate relief for any material passing through an opening.

The screen configuration of FIGS. 13-15 is also of great value in view of its inherent strength. Thus, reinforcing means may be eliminated or at least minimized, the structure is adaptable to very high pressure conditions, and long operating life can be anticipated.

The system of the invention is characterized by a high degree of versatility since sludge of varying solids content can be introduced to the system and then treated with a flocculating agent in accordance with this solids content. Thus, the monitoring of the sludge permits continuous variation in the amount of polymer or other flocculating agent introduced so that material delivered to the progressive cavity press will be of essentially uniform character.

To the extent that variations in the output of the continuous cavity press are detected, the operation of the press can be adjusted to further insure uniformity. Thus, the speed of the screw employed in the press can be varied and, at the same time, variations can be made in the openings defined by the respective discs 110 and 112 to achieve control of the solids content. Thus, a reduction in the size of the openings will increase the pressure required to force the sludge through the openings which, in turn, will increase the amount of liquid removed from the sludge before it exits from the press.

It will also be appreciated that the system permits the production of sludge with a solids content which can be handled in an efficient fashion. Thus, there is a point beyond which the expense of reducing the solids content exceeds the savings which can be achieved by reducing the volume of sludge to be transported to a permanent disposal site such as a land fill. That point will vary depending upon the distance required and the mode of transportation. Once the optimum percentage of solids has been determined, the systems of this invention provide the most efficient means for achieving that optimum. As indicated, the optimum will typically be between 20 and 35 percent solids content.

Versatility in the operations described is also provided by means of the reversible conveyor 54 which permits by-passing of the press 62. Thus, to the extent a given system can be partially operated by delivering a low-solids content sludge to beds shown at 60, or where the low solids content sludge has utility as a fertilizer or the like, the system of this invention can easily accommodate.

It will be understood that various changes and modifications may be made in the above system which provide the characteristics of the invention without departing from the spirit thereof particularly as defined in the following claims.

I claim:

1. A method for extracting liquids from sludge comprising the steps of providing a source of sludge, providing a source of a treatment chemical adapted to achieve flocculation of the sludge, mixing said sludge and said chemical for achieving a flocculated mixture, delivering said mixture to a progressive cavity continuous press and feeding the mixture through the press, said press comprising a housing defining wall openings and an interior shaft with the size of the cavity defined by the shaft and housing progressively decreasing from the inlet end to the outlet end of the press whereby the mixture is gradually compressed as it progresses through the press, and whereby liquid contained in the mixture is extracted through the openings of the housing wall, providing a separate discharge chamber adjacent the outlet end of the press, associating pressure means with the discharge chamber and applying continuous pressure to the mixture in the chamber whereby the mixture is continuously fed through the press in opposition to the pressure means of the discharge chamber to thereby enhance the extraction of liquid, and collecting the mixture at an outlet end of the press.

2. A method in accordance with claim 1 wherein said chemical comprises a polymer.

3. A method in accordance with claim 1 including the step of varying the pressure applied to the mixture in the discharge chamber order to control the solids content of the mixture issuing from the outlet end of the press.

4. A method in accordance with claim 3 including the step of measuring the solids content of the sludge provided from said source, and varying the amount of chemical mixed with said sludge in accordance with the measurement of solids content.

5. A method in accordance with claim 4 including the step of incorporating said chemical in an aqueous solution, and varying the concentration of the chemical in the solution by controlling the amount of water added to the solution prior to mixing of the solution into said sludge.

6. A method in accordance with claim 1 including the step of providing a distribution means, and holding the mixture in the distribution means prior to delivery to the press.

7. A method in accordance with claim 1 wherein said sludge and said chemical are combined just prior to introduction into the distribution means.

8. A method for extracting liquids from sludge comprising the steps of providing a source of sludge, providing a source of a polymer treatment chemical adapted to achieve flocculation of the sludge, mixing said sludge and said chemical for achieving a flocculated mixture, delivering said mixture to progressive cavity continuous press and feeding the mixture through the press, said press comprising a housing defining wall openings and an interior shaft with the size of the cavity defined by the shaft and housing progressively decreasing from the inlet end to the outlet end of the press whereby the mixture is gradually compressed as it progresses through the press, and whereby liquid contained in the mixture is extracted through the openings of the housing wall, varying the pressure applied to the mixture in order to control the solids content of the mixture issuing from the outlet end of the press, measuring the solids content of the sludge provided from said source, and varying the amount of chemical mixed with said sludge in accordance with the measurement of solids content, and collecting the mixture at an outlet end of the press.

* * * * *